US008196288B2

(12) United States Patent
Wagner et al.

(10) Patent No.: US 8,196,288 B2
(45) Date of Patent: Jun. 12, 2012

(54) DOUBLE CRIMPING TOOL

(75) Inventors: Thomas Wagner, Bermbach (DE); Edgar Wilhelm, Altersbach (DE); Horst Hofmann, Unterschönau (DE)

(73) Assignee: Airbus Operations SAS, Toulouse (FR)

( * ) Notice: Subject to any disclaimer, the term of this patent is extended or adjusted under 35 U.S.C. 154(b) by 697 days.

(21) Appl. No.: 11/991,590

(22) PCT Filed: Aug. 25, 2006

(86) PCT No.: PCT/EP2006/008367

§ 371 (c)(1), (2), (4) Date: Apr. 6, 2009

(87) PCT Pub. No.: WO2007/028514

PCT Pub. Date: Mar. 15, 2007

(65) Prior Publication Data

US 2009/0205199 A1 Aug. 20, 2009

(30) Foreign Application Priority Data

Sep. 6, 2005 (DE) ........................ 10 2005 042 450

(51) Int. Cl.
*B23P 19/00* (2006.01)
*H01R 43/042* (2006.01)

(52) U.S. Cl. ................ 29/751; 29/237; 29/753; 29/761; 72/403; 72/409.09; 72/409.14

(58) Field of Classification Search .................... 29/751, 29/237, 753, 761; 72/402, 403, 409.09, 409.14
See application file for complete search history.

(56) References Cited

U.S. PATENT DOCUMENTS

| | | | | |
|---|---|---|---|---|
| 3,059,511 | A | 10/1962 | Morris | |
| 3,713,322 | A | 1/1973 | Fischer | |
| 5,038,461 | A * | 8/1991 | Cerda | 29/753 |
| 5,153,984 | A | 10/1992 | Beetz et al. | |
| 5,261,263 | A | 11/1993 | Whitesell | |
| 5,415,015 | A | 5/1995 | Klemmer et al. | |

(Continued)

FOREIGN PATENT DOCUMENTS

DE 4023337 C1 10/1991

(Continued)

OTHER PUBLICATIONS

Military Specification Sheet, MIL-C-22520/20, Mar. 1976, 2 pages.

*Primary Examiner* — Thiem Phan

(74) *Attorney, Agent, or Firm* — Lerner, David, Littenberg, Krumholz & Mentlik, LLP

(57) ABSTRACT

A double crimping tool for fastening an electrical conductor with insulation to a contact element, which includes a front crimping unit with a front drive cam plate and front crimping stamps for forming a front press section in the region of the stripped end of the conductor; and a rear crimping unit with a rear drive cam plate and rear crimping stamps for forming a rear press section in the region of the insulation of the conductor. The crimping stamps are displaced by rotation of the drive cam plates. By levers the two drive cam plates are connected to a shared force introduction element such that during the pressing procedure at first optionally the front or the rear drive cam plate is rotated by a predefined initial pressing angle while the other drive cam plate is made to rotate only after the first drive cam plate has attained the initial pressing angle.

12 Claims, 2 Drawing Sheets

U.S. PATENT DOCUMENTS

| | | | | |
|---|---|---|---|---|
| 5,806,168 | A | 9/1998 | Wurst et al. | |
| 6,176,116 | B1 | 1/2001 | Wilhelm et al. | |
| 7,162,909 | B2 * | 1/2007 | Kelly et al. | 72/409.14 |

FOREIGN PATENT DOCUMENTS

| | | | |
|---|---|---|---|
| DE | 195 07 347 | C1 | 9/1996 |
| DE | 19509442 | | 9/1996 |
| EP | 643457 | | 3/1995 |
| EP | 1598906 | | 11/2005 |
| RU | 2123222 | C1 | 12/1998 |
| RU | 2231186 | C2 | 6/2004 |
| WO | 2004021523 | | 3/2004 |

* cited by examiner

DOUBLE CRIMPING TOOL

CROSS-REFERENCE TO RELATED APPLICATIONS

The present application is a national stage entry of Patent Cooperation Treaty Application No. PCT/EP2006/008367, filed Aug. 25, 2006, which claims the benefit of the filing dates of German Patent Application No. 10 2005 042450.3, filed Sep. 6, 2005, the entire disclosures of which are hereby incorporated herein by reference.

The present invention relates to a double crimping tool for fastening an electrical conductor with insulation to a contact element. In particular, the invention relates to a double crimping tool for fastening an electrical conductor with insulation to a contact element.

BACKGROUND OF THE INVENTION

Such a tool is used for fastening an electrical conductor enclosed by an insulation sheath, which conductor can be a single- or multi-core wire, to a contact element, for example a wire end sleeve, a cable lug or a contact socket. By the double crimping tool both an electrically conductive connection between the conductor and the contact element is to be established, and an insulation section adjoining the stripped conductor end is to be fastened to the contact element by a pressing procedure. The crimping tool can be designed as a band tool or as a machine-driven tool.

From U.S. Pat. No. 3,713,322 a crimping tool for connecting a contact to a wire end is known. This tool uses two pairs of press pistons which in guide slots are displaced radially in relation to a receiving cross section so as to press the sleeve positioned in the receiving cross section together with the inserted wire end. In this arrangement initially the first stamp pair with flat anvil surfaces is brought to the contact sleeve in order to press said contact sleeve against an oval shape. During the further crimping process the stamp pair that is positioned across the first stamp pair is brought to the pre-pressed contact sleeve in order to complete the crimping process by curved anvil surfaces. The four press pistons are driven by a shared cam ring, wherein the advance of the individual press stamps is determined by the radially changing surface design on the inside of the cam ring. With this known crimping tool only one crimping process is possible in the region of the stripped end of the cable. Furthermore, during the crimping process a user of the hand tool has to exert considerable forces.

U.S. Pat. No. 5,415,015 shows a crimping tool by which in a single crimping process both in the section of the stripped electrical conductor and in the insulation section a press connection with the contact element to be connected can be established. To this purpose the described manual tool, on two opposing stamps, comprises two differently designed anvil surfaces, situated axially one behind the other, which curing the crimping process act at the same time on the contact region and on the insulation region in order to deform the sleeve-shaped sections of the contact pin. To this effect the press stamps must be matched in a targeted manner to the shape of the contact sleeve. Consequently any processing of different cross sections is largely excluded. Furthermore, with the known crimping tool it is not possible to establish crimping connections that meet stringent safety requirements in the case of permanent strain at the crimp position.

The standard MIL-C-22520/20, dated 19 Mar. 1976, which requires the use of four crimping stamps that contact the circumference of the crimp section, in each case offset by 90°, and that carry out the pressing procedure in pairs, describes the design of a crimp connection that meets such safety requirements and describes the basic design of a tool suitable to achieve this. The requirements of this standard are, for example, met by the crimping tool according to the above-mentioned U.S. Pat. No. 3,713,322. Therefore, when designing a crimping tool that conforms to the standard mentioned, the average person skilled in the art is thus limited in his/her freedom of development so that up to now there was little detectable scope for improvements.

WO 2004/021523 A1 discloses a crimping tool by which the concurrent establishment of a press connection in the section of the stripped conductor end and in the adjacent insulation section is to be made possible. To this effect two crimping units, arranged one behind the other, are provided, each comprising four crimping stamps which during the crimping process at the same time are radially displaced into the receiving cross section where they press the contact sleeve and the conductor together. Concurrent pressing together in the conductor region and in the insulation region requires extremely large forces, in particular at larger cross-sections, which forces can no longer be exerted by a user using a hand tool. The substantial loads encountered result in rapid wear of the press stamps. Furthermore, an unfavourable position displacement of the electrical conductor in the contact sleeve may result when press forces act on the insulation region before the conductor has been adequately fastened in the contact sleeve. Finally, the known crimping tool does not make it possible to process various cross-sections without the individual press stamps being changed.

DE 195 07 347 C1 describes press pliers for wire end sleeves. These press pliers use six press jaws that are swivellably held on bearing pins, and that, when a ring-shaped swivel lever is actuated, are swiveled into the cross section that receives the wire end sleeve in order to carry out the pressing procedure by the resulting reduction in cross section. However, these press pliers do not make it possible to simultaneously produce two crimp connections in axially successive sections and is furthermore not permissible if conductor ends are to be crimped, according to the above-mentioned standard, to wire end sleeves.

From DE 4023 337 C1 a tool for crimping a double connection of a connector with a conductor on the one hand and an insulation on the other hand is known. The tool comprises a tool head that has a frame and a press jaw that is axially affixed to the frame, as well as a press jaw that is axially guided on the frame. The axially guided press jaw comprises at least two stamp plates that have work profiles, and by a drive is pressed against the axially fixed press jaw which in that location comprises at least two anvil plates that have work profiles. At least one of the anvil plates or stamp plates is swivellable, on the respective other anvil plate or stamp plate, on an axis that is arranged so as to be perpendicular in relation to the axis of principal extension so that another edge with a differently designed work profile becomes effective when the jaws are pressed together.

From DE 195 09 442 C2 crimping pliers for the manually actuated fastening of a connector plug to a cable are known, in which four die inserts with several crimp nests are placed onto two opening jaws. The four crimp nests are arranged in the die inserts so as to be placed side by side, of which four crimp nests at least one is arranged such that jamming the tension relief for the cable to be attached to the connector plug takes place on opposite sides of the die inserts. The solution known from this printed publication is, in particular, suitable for crimping connectors to ignition cables.

BRIEF SUMMARY OF THE INVENTION

From EP 1 598 906 A1 a crimping tool with a rotatable stamp is known, which on its side comprises four differently sized crimp profiles. The rotatable stamp is pressed against a fixed press jaw that comprises two differently sized crimp nests. By rotating the rotatable stamp, one of the four different crimp profiles can be selected, wherein in each case the selected crimp profile is opposite the suitable one of the two crimp nests.

It is thus the object of the present invention to provide an improved crimping tool, by which in a single crimping process a double crimp connection in axially offset regions of a contact element can be produced in order to connect both the stripped conductor end and the end region of the insulation to the contact element. In cross sections that are usual for crimp connections, this is to be possible with the exertion of little force that can be provided by a user in single-handed manual operation, so that the crimping tool can also be designed in the form of a hand tool. The crimping tool should be able to be adapted to various contact element types, contact element sizes and cable cross-sections without much effort. Finally, the crimping tool should make it possible, at least in the section of the stripped wire end, to generate a crimp connection that complies with the MIL-standard.

This object is met by a double crimping tool for fastening an electrical conductor with insulation to a contact element, comprising a front crimping unit with a front drive cam plate and front crimping stamps forming a front press section in the region of the stripped end of the conductor, and a rear crimping unit with a rear drive cam plate and rear crimping stamps for forming a rear press section in the region of the insulation of the conductor. The crimping stamps of each crimping unit comprise anvil surfaces that are directed towards each other. Between said anvil surfaces is a receiving cross section for receiving sections of the contact element. Said sections are to be pressed together with the conductor inserted therein. The crimping stamps are displaced by rotation of the drive cam plates to carry out the pressing procedure by narrowing the receiving cross section. By levers the two drive cam plates are connected to a shared force introduction element such that during the pressing procedure at first the front or the rear drive cam plate is rotated by a predefined initial pressing angle so as to, in the associated press region, reduce the receiving cross section, while the other drive cam plate is made to rotate only after the first drive cam plate has attained the initial pressing angle, in order to reduce the receiving cross section in the other press region.

To this effect on the double crimping tool a front crimping unit and a rear crimping unit are each operated by their own drive cam plates, wherein both cam plates are connected, by levers, to a shared force introduction element so that in the pressing procedure first one drive cam plate is rotated by a predetermined initial pressing angle, and only thereafter is the second drive cam plate set into motion in order to also crimp the insulation region. Depending on the embodiment it is possible in this arrangement for the crimping process in the conductor region to be partly or almost fully completed before the crimping process is carried out in the insulation region. As a result of this measure the forces required are considerably reduced. Actuation of the drive cam plates can, however, also take place in the reverse sequence so that crimping takes place only in the rear press region, followed by crimping in the front press region.

Furthermore, the required drive force can be reduced in that a force-path conversion takes place by the toggle-lever technique that is known per se.

Preferably, the front crimping unit, by which the crimp connection is established in the stripped conductor section, comprises four crimping stamps that are slidable radially in relation to the receiving cross section. The front crimping unit is in this way preferably designed according to the above-mentioned MIL-standard.

In order to achieve a good crimp result in the insulation region while exerting little in the way of force, instead several crimping stamps are used in the rear crimping unit, which crimping stamps are swivellably held, with their anvil surfaces tangentially swiveling into the receiving cross section. For practical implementation of such a design, reference is made to the cited DE 195 07 347 C1.

Further preferred embodiments are also provided herein.

BRIEF DESCRIPTION OF THE DRAWINGS

Details, advantages and embodiments of the present invention are stated in the following description of a preferred embodiment with reference to the drawings. The following are shown.

DETAILED DESCRIPTION OF THE DRAWINGS

Figure 1:
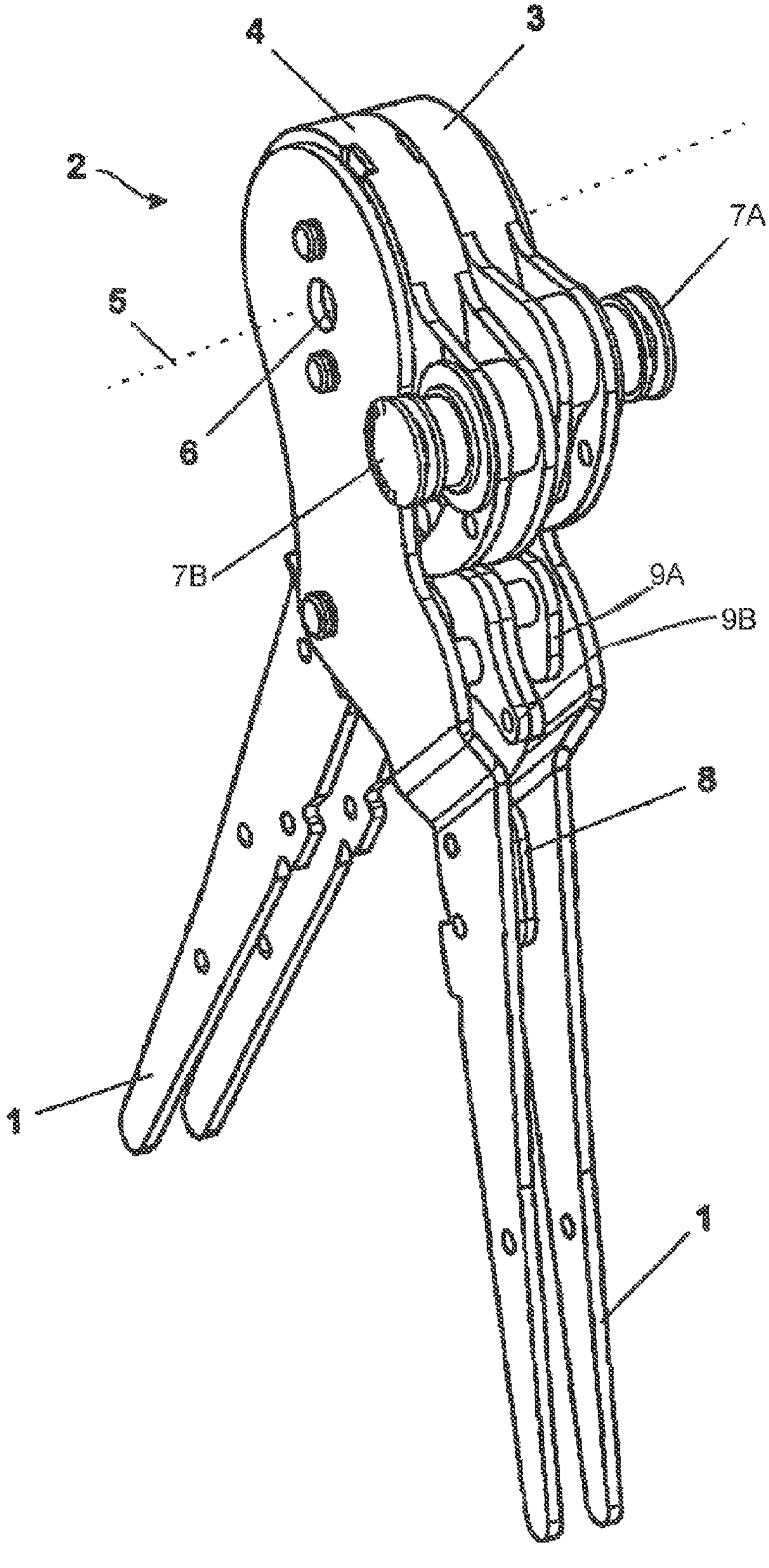
FIG. 1 a perspective view of a double crimping tool in the form of a hand tool.

The double crimping tool, according to the invention, shown in FIG. 1 is designed as a hand tool that is suitable for single-handed operation. To this effect this hand tool in the conventional manner first comprises two handles 1 that for improved ergonomics can additionally comprise plastic grips formed to fit the hand.

The actual double crimping tool is arranged in the tool head 2. It comprises a front crimping unit 3 and a rear crimping unit 4. The two crimping units 3, 4 are arranged axially one behind the other in relation to a workpiece axis 5. Along the workpiece axis 5 in a central receiving cross section 6, an axis 110A of which, when the tool is in its open position, continues in the two crimping units 3, 4, a contact element and an electrical conductor (not shown) to be affixed to said contact element are inserted.

Preferably, each crimping unit 3, 4 comprises its own respective adjusting element 7A, 7B, by way of which various crimp dimensions (cross section of the longitudinal section that is to be pressed by the respective crimping unit) can be set. The way the adjusting elements 7A, 7B function will be explained in detail further below with reference to a special embodiment.

Furthermore, an activation detent 8 can be built into the hand tool, which activation detent 8, following commencement of the crimping process, only allows the tool to be opened again after the end position of the crimping units has been reached. This ensures that the desired final dimension during crimping is adhered to in each case. In the embodiment shown, furthermore, two toggle levers 9A, 9B (collectively “toggle levers 9”) are provided, which are used for the transmission of force from the handles 1 to the crimping units 3, 4, respectively. Toggle levers 9A, 9B respectively include first ends 50A, 50B and second ends 60A, 60B.

Figure 2:
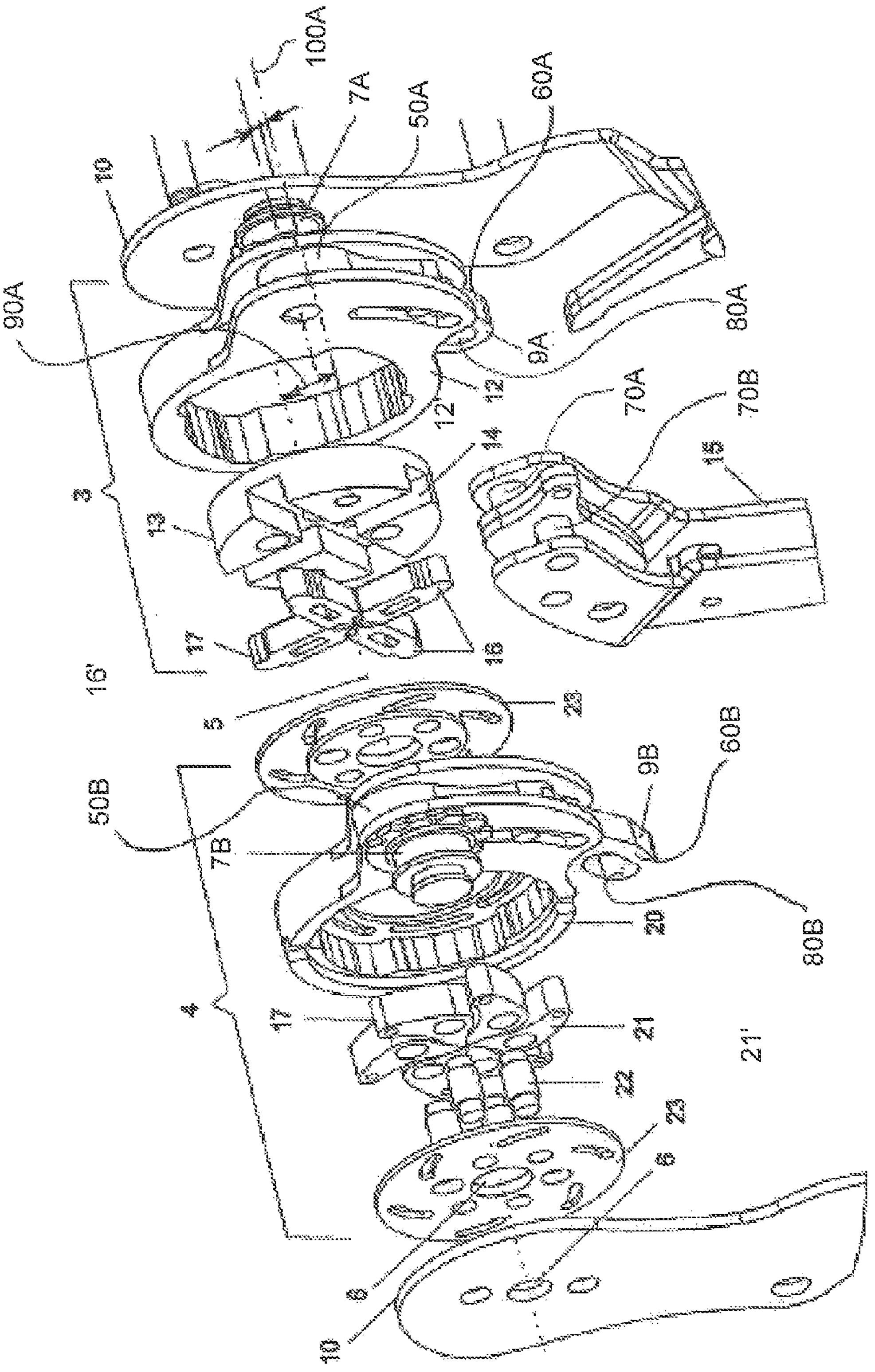
FIG. 2 an exploded view of the tool head of the hand tool shown in FIG. 1.

FIG. 2 shows an exploded view of the tool head with the essential components of the crimping tool. The individual parts are enclosed between two retaining plates 10, which can be designed as an extension of one handle 1.

The front crimping unit 3 comprises a front drive cam plate 12, whose inside comprises a profiled surface 12' so that a resulting distance 90A between the workpiece axis 5 and an imaginary axial extension 100A of this surface 12' varies. In the front drive cam plate 12 a guiding disc 13 with four cross-shaped guide slots 14 is inserted. The guiding disc 13 is arranged so as to be stationary in relation to the retaining plates 10, while the front drive cam plate 12 is rotatable relative to the guiding disc 13. The drive force required for this rotation is introduced by way of the toggle levers 9A, 9B and a shared drive lever 15.

The front crimping unit 3 is further associated with four front crimping stamps 16 that are guided in the guide slots 14. FIG. 2 shows the crimping stamps in their closed state in which their inward-facing anvil surfaces 16' are in close proximity to each other. In the open state of the tool, the crimping stamps unblock the receiving cross section 6 in order to receive the contact element with the inserted electrical conductor. In order to move the front crimping stamps to their home positions, spring elements (not shown in the drawing) are arranged in a manner that is known per se.

The actuation surfaces 17 of the front crimping stamps 16, which actuation surfaces 17 are situated radially outward in relation to the receiving cross section 6, come to rest against the cam surface of the front drive cam plate 12, and due to the surface design are moved radially inward during rotation of the front drive cam plate 12 so as to press the stripped section of the conductor in the contact element.

The rear crimping unit 4 comprises a rear drive cam plate 20 with the toggle lever 9B that acts thereon, which toggle lever 9B in turn is driven by the drive lever 15. Furthermore, there are six rear crimping stamps 21 whose actuation surfaces 17 rest against the profiled interior surface of the rear drive cam plate 20.

The rear crimping stamps 21 are swivellably held by carrying lugs 22 that in turn are fastened to supporting plates 23. During actuation of the rear drive cam plate 20, which actuation takes place by rotation on the workpiece axis 5, each rear crimping stamp 21 is swiveled on its carrying lug 22 so that inward anvil surfaces 21' of the rear crimping stamps 21 tangentially engage the receiving cross section 6 in order to narrow it, as a result of which the longitudinal section, positioned in that location, of the contact element is pressed around the insulation of the electrical conductor. This results in a hexagonal profile formation in the insulation region. In the case of modified embodiments, it is also possible to use a greater or lesser number of rear crimping stamps; however, the use of six rear crimping stamps has been shown to be advantageous.

The supporting plates 23 in conjunction with spring units (not shown) at the same time are used to achieve forced return travel of the rear crimping stamps 21.

Both in the front crimping unit and in the rear crimping unit the drive forces are transmitted by way of the above-mentioned toggle levers 9. Said toggle levers 9, as far as their length and their position of coupling to the drive cam plates 12, 20 on the one hand, and to first and second studs 70A, 70B of the drive lever 15, via a round hole 80A in toggle lever 9A and an elongated hole 80B in toggle lever 9B, respectively, on the other hand are concerned, are designed such that when the hand tool is actuated, at first only the front drive cam plate 12 is made to rotate. Only after a predetermined press angle of, for example, 15.degree. has been covered, does the drive force act upon the rear drive cam plate 20 so that the latter is also made to move. The initial pressing angle can, preferably in the region between 10.degree. and 30.degree., be selected such that at least partial pressing in the front crimping unit between the stripped conductor end and the contact element is achieved or that this pressing procedure is already considerably advanced. Depending on the embodiment, in the subsequent press step both drive cam plates are rotated at the same time over a determined angle section, or at this stage largely only rotation of the rear drive cam plate 20 takes place to establish the crimp connection between the insulated conductor section and the contact element.

In the embodiment shown on each drive cam plate there is an already mentioned respective adjusting element 7A, 7B, by which in each crimping unit the cross-sectional dimension can be set, which cross-sectional dimension is to be achieved on completion of the crimping process. In the embodiment shown cams are used as adjusting elements 7A, 7B, by way of which cams the cam travel for the respective drive cam can be set. In this way the effective length of the engaging lever is changed, wherein in each case on completion of the set cam travel any further rotation of the drive cam plate is stopped so that the associated crimping stamps do not penetrate any further into the receiving cross section.

By the separate settability the double crimping tool can easily be adjusted to various cross-sectional dimensions, so that with a single tool various contact elements and conductor cross sections can be processed.

The settability also makes possible any re-setting of the crimp dimensions, which re-setting becomes necessary due to wear and tear.

In modified embodiments it is, for example, also possible to use a revolver adjusting stop for setting the crimp end dimension.

LIST OF REFERENCE CHARACTERS

1—Handle
2—Tool head
3—Front crimping unit
4—Rear crimping unit
5—Workpiece axis
6—Receiving cross section
7A, 7B Adjusting elements
8—Activation detent
9A, 9B Toggle levers
10—Retaining plates
12—Front drive cam plate
12' profiled surface
13—Guiding disc
14—Guide slots
15—Drive lever
16—Front crimping stamps
16' anvil surfaces
17—Actuation surfaces
21' anvil surfaces
20—Rear drive cam plate
21—Rear crimping stamps
22—Carrying lug
23—Supporting plates
50A first end of toggle lever 9A
50B first end of toggle lever 9B
60A second end of toggle lever 9A
60B second end of toggle lever 9B
70A first stud
70B second stud
80A round hole
80B elongated hole
90A distance
100A imaginary axial extension

The invention claimed is:

1. A double crimping tool for fastening an electrical conductor with insulation to a contact element, comprising:

a first crimping unit comprising a first drive cam plate and a first plurality of crimping stamps for forming a first press section in the region of a stripped end of the electrical conductor;

a second crimping unit comprising a second drive cam plate and a second plurality of crimping stamps for forming a second press section in the region of the insulation of the electrical conductor;

wherein the first plurality of crimping stamps comprise a first plurality of respective anvil surfaces that are directed towards each other, wherein the second plurality of crimping stamps comprise a second plurality of respective anvil surfaces that are directed towards each other, wherein between said first plurality of respective anvil surfaces is a first receiving cross section for receiving a first set of sections of the contact element, wherein between said second plurality of respective anvil surfaces is a receiving cross section for receiving a second set of sections of the contact element, wherein said first and second sets of sections of the contact element are adapted to be pressed together with the electrical conductor, wherein the first plurality of crimping stamps are displaced by rotation of the first drive cam plate to carry out the pressing procedure by narrowing the first receiving cross section, wherein the second plurality of crimping stamps are displaced by rotation of the second drive cam plate to carry out the pressing procedure by narrowing the second receiving cross section, wherein the first drive cam plate and the second drive cam plate are connected to a common force introduction element by a first lever and a second lever, respectively, such that during the pressing procedure the first drive cam plate is rotated by a predefined initial pressing angle to reduce the first receiving cross section in the press section of the first drive cam plate, and the second drive cam plate is made to rotate only after the first drive cam plate attains the predefined initial pressing angle, in order to reduce the second receiving cross section in the press section of the second drive cam plate.

2. The double crimping tool of claim 1, wherein when the initial pressing angle has been reached, the first and the second drive cam plates are together rotated by a predetermined angle.

3. The double crimping tool of claim 1, further comprising:

a first adjusting element which, when an intermediate angle has been reached, stops any further rotation of the first drive cam plate; and a second adjusting element;

wherein the second drive cam plate continues to rotate until the second adjusting element is engaged by the second drive cam plate.

4. The double crimping tool of claim 3, wherein the first adjusting element is arranged on the first crimping unit, wherein the first adjusting element is adapted to vary the effective cam travel of the first drive cam plate to set a first crimp dimension.

5. The double crimping tool of claim 3, wherein the second adjusting element is arranged on the second crimping unit, wherein the second adjusting element is adapted to vary the effective cam travel of the second drive cam plate to set a second crimp dimension.

6. The double crimping tool of claim 1, wherein the force introduction unit comprises a drive lever connected to a first toggle lever and to a second toggle lever, wherein the first toggle lever drives the first drive cam plate, and wherein the second toggle lever drives the second drive cam plate.

7. The double crimping tool of claim 1, wherein the first plurality of crimping stamps comprises a first, a second, a third, and a fourth crimping stamp that are radially slidable in relation to the receiving cross section and that are arranged offset from one another by approximately 90°.

8. The double crimping tool of claim 1, wherein the second plurality of crimping stamps are swivellably held, wherein the second plurality of anvil surfaces swivel tangentially into the second receiving cross section when the second plurality of crimping stamps are activated by the second drive cam plate.

9. The double crimping tool of claim 1, wherein the tool comprises a hand tool configured for single-handed operation.

10. The double crimping tool of claim 9, further comprising:

a first retaining plate;

a second retaining plate;

a first handle; and a second handle;

wherein the first crimping unit and the second crimping unit are arranged between the first retaining plate and the second retaining plate, wherein the first retaining plate is connected to the first handle, wherein the second handle is connected to a drive lever which is operatively connected with at least one of the first drive cam plate and the second drive cam plate.

11. The double crimping tool of claim 9, further comprising an activation detent that allows the hand tool to open only after the first and the second crimping units each reach a predetermined end position.

12. The double crimping tool of claim 1, further comprising a machine drive for operation of the tool.

* * * * *